United States Patent
Hilvitz et al.

[15] 3,667,372
[45] June 6, 1972

[54] FOOD COOKING APPARATUS

[72] Inventors: Arthur L. Hilvitz; Philip E. Hilvitz; Harvey M. Hilvitz; Richard Campbell, all of Pueblo, Colo.

[73] Assignee: La Tolteca Foods, Inc., Pueblo, Colo.

[22] Filed: Nov. 13, 1969

[21] Appl. No.: 876,429

[52] U.S. Cl. .............................................. 99/404, 99/427
[51] Int. Cl. ............................................. A47j 37/12
[58] Field of Search ............... 99/404, 443 C, 439, 427, 386; 15/3.15; 118/30; 249/92

[56] References Cited

UNITED STATES PATENTS

| | | | |
|---|---|---|---|
| 2,967,474 | 1/1961 | Ford | 99/404 |
| 3,267,836 | 8/1966 | Yepis | 99/404 |

*Primary Examiner*—Leon G. Machlin
*Attorney*—McGrew and Edwards

[57] ABSTRACT

There is disclosed a food cooking apparatus having a conveyor positioned over a cooking vessel. The cooking vessel is filled with frying fat and means are provided for heating the fat to a predetermined temperature. A plurality of normally open food molds are mounted on the conveyor. Uncooked tortilla cakes are loaded into the normally open molds and the conveyor operates to move each loaded food mold into engagement with guides which define a path through the cooking vessel. The guides operate to fold the loaded food molds into a closed position, thereby to form a U-shaped tortilla. Means are also disclosed on each mold to prevent the accidental opening of the mold while it is in the guides. Pusher means are further included in each food mold for automatically discharging cooked tortillas onto a tray.

19 Claims, 4 Drawing Figures

FIG. 1

INVENTORS
ARTHUR L. HILVITZ
PHILIP E. HILVITZ
HARVEY M. HILVITZ
BY  RICHARD CAMPBELL

ATTORNEYS

INVENTORS
ARTHUR L. HILVITZ
PHILIP E. HILVITZ
HARVEY M. HILVITZ
RICHARD CAMPBELL
BY
ATTORNEYS

FOOD COOKING APPARATUS

The present invention relates to food cooking apparatus, and more particularly to food cooking apparatus suitable for cooking V-shaped food products, such as tortillas and certain other types of Mexican foods.

Tortillas, which are thin, unleavened maize cakes are generally formed into a V-shape and then cooked in a vat of deep fat. The V-shape is essential for this food product, as well as for certain other Mexican food products, since relishes and other foods are often placed in the tortillas before they are eaten.

Heretofore, food cooking machines for cooking V-shaped food products have been constructed. These prior art machines, however, have generally required much operator supervision and consequently, have been limited to relatively low output rates.

It is, accordingly, an object of the present invention to provide an improved food cooking apparatus which is substantially automatic in operation and capable of producing cooked V-shaped food products, such as tortillas, at a relatively high output rate and at low cost.

It is further an object of the present invention to provide an improved food cooking apparatus as set forth which automatically discharges the cooked tortillas.

It is another objective of the present invention to provide an improved food cooking apparatus as set forth which automatically collects the cooked tortillas.

It is additionally an object of the present invention to provide an improved food cooking apparatus as set forth having a novel mold assembly for molding the uncooked tortillas and thereafter discharging the cooked tortillas.

In accomplishing these and other objects, there has been provided in accordance with the present invention, a food cooking apparatus having endless conveyor means having one stretch extending through and other portions positioned over a cooking vessel. The cooking vessel is filled with frying fat and means are included for heating the fat to a predetermined temperature. A plurality of normally open food molds, or food holding units, are mounted on the conveyor means. Uncooked tortilla cakes are loaded into the molds in their open position and the molds are operative when closed to form the uncooked cakes into V-sa ped tortillas. The conveyor operates in a cycle to move each loaded food mold into engagement with guide means which define a path through the cooking vessel. The guide means, upon engagement with each mold, operates to fold the loaded food molds into a closed position, thereby a V-shaped tortilla is formed. Means are also included on each food mold to prevent the accidental opening of the mold while it is in the guide means. Pusher means are further included in each food mold for automatically discharging the cooked tortillas onto a food gathering means once each food mold moves out of engagement with the guide means.

A better understanding of the present invention may be had from the following detailed description when read in conjunction with the accompanying drawings, in which.

Figure 1:
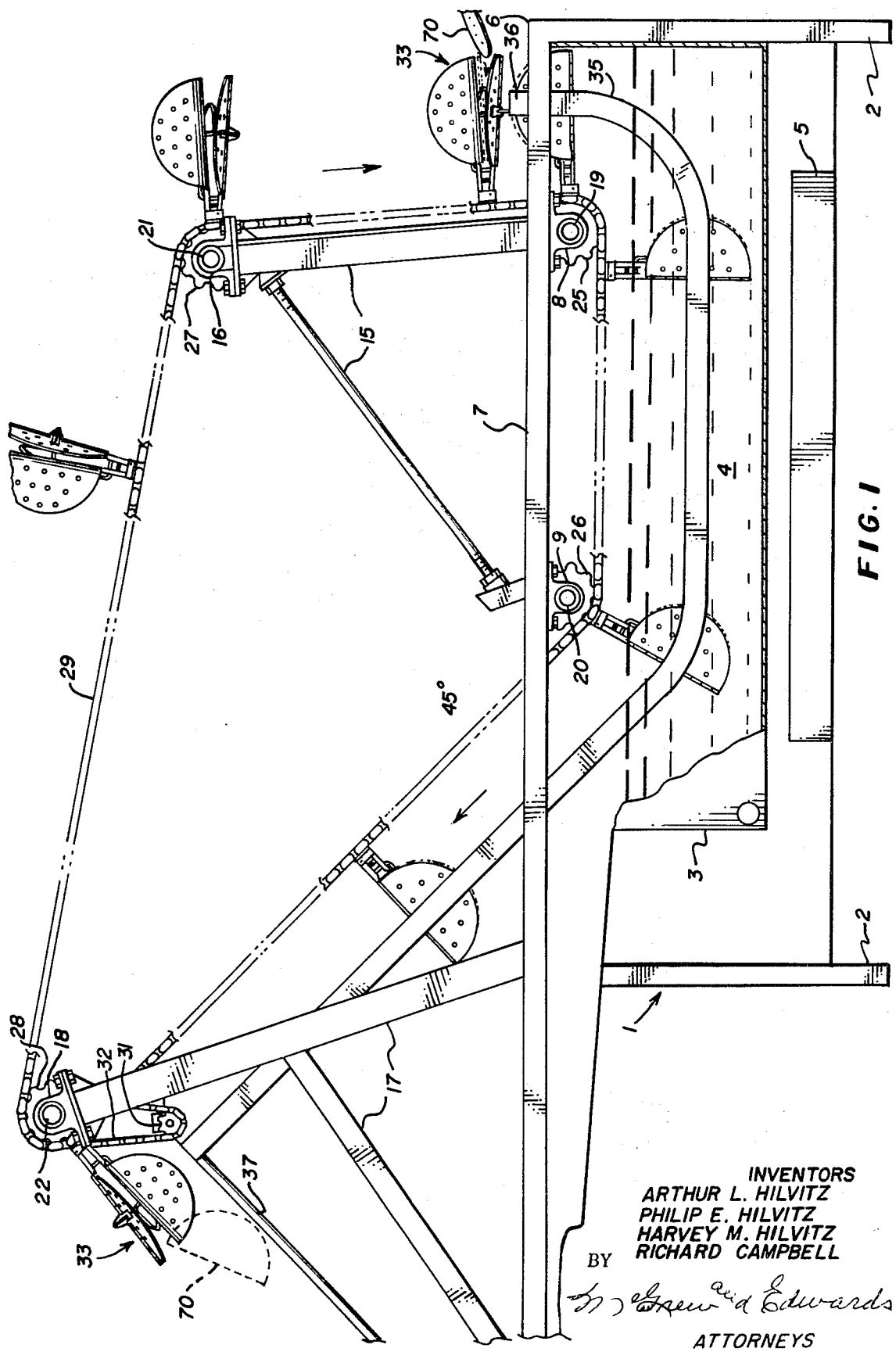
FIG. 1 is an elevation view of a food cooking apparatus according to the present invention, partially broken to show interior arrangements.
Figure 2:
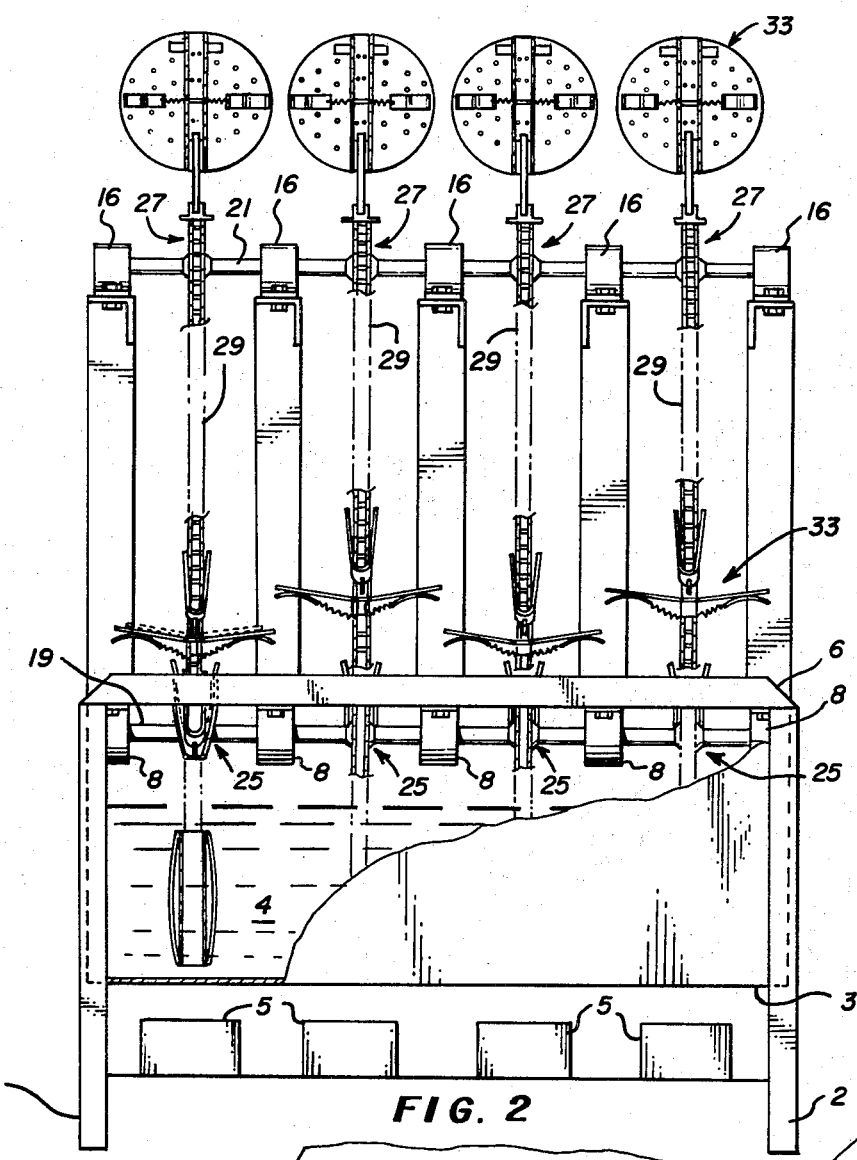
FIG. 2 is an end view of the right handed or loading end of the food cooking apparatus of FIG. 1.

Referring to the drawings, in more detail, there is shown in FIGS. 1 and 2 a cooking vessel 1. The cooking vessel 1 has legs 2 and defines a rectangular bath or vat 3 open at its top. The vat 3 is filled with a suitable frying fat 4 and a heat source 5, such as burners, is located immediately below the vat 3. Mounted on the right handed end, as shown in FIG. 2, and across the width of the cooking vessel 1 is a horizontal extending support member 6. A plurality of spaced parallel support members 7 are mounted on the support member 6. The support members 7 preferably are equally spaced across the width of the cooking vessel 1 and extend horizontally beyond the left end of the cooking vessel 1. The left end of the support members 7 is suitably supported.

Appropriately spaced pillow blocks 8 and 9 are mounted over the vat 3 on each of the support members 7. As shown in FIG. 1, the pillow blocks 8 are mounted near the right hand end of the vat 3. The pillow blocks 9 are mounted near the left hand end. Vertically extending structure 15 is mounted on each of the support members 7 to support pillow blocks 16 above and slightly to the left of the pillow blocks 8, as shown in FIG. 1. Vertically extending structure 17 is also mounted on each of the support members 7 to support pillow blocks 18 above and to the left of the vat 3.

Horizontally extending shafts 19, 20, 21, and 22 are journaled through the pillow blocks 8, 9, 16, and 18, respectively. The shafts 19–22 extend across the width of the cooking vessel 1 and have mounted between the respective pillow blocks sprocket wheels 25, 26, 27, and 28, respectively. The sprocket wheels 25–28 are mounted between the respective pillow blocks so as to form sets of sprocket wheels aligned substantially in the same vertical plane. An endless chain 29 engages and extends around each set of the vertically aligned sprocket wheels 25–28, and the wheels 25–28, along with the shafts 19–22, provide means for driving the chains 29. While the shafts 19–21 are each shown as a solid unit extending across the cooking vessel 1, it may be found desirable to have one of the shafts, such as shaft 21, in the form of a split shaft so that the tension on the endless chains 29 may be individually adjusted. Power drive means in the form of an adjustable speed motor 31 and a chain drive 32 are shown in FIG. 1. The chain drive 32 is connected between the motor 31 and the shaft 22. The motor 31 functions, when operating, to continuously drive the shaft 22. Thereby, the endless chains 29 are continuously driven around the pillow blocks 8, 9, 16, and 18.

As shown in FIG. 2, endless chains 29 are employed in the exemplary food cooking apparatus. Each of the chains 29 has mounted thereon normally open food molds, or food holding units 33 which are described hereinafter. The molds 33 are each mounted on the chains 29 to extend outwardly away from the pillow blocks 8, 9, 16, and 18. Representative ones of the food molds 33 are identified in FIGS. 1 and 2.

Parallel sets of guide rails 35 are mounted between the support members 7. Each set of guide rails 35 defines a path for the molds 33, as shown in FIG. 1, from an entrance point to the right of the pillow block 8, through the fluid fat 4 in the vat 3 and upward to the left to an exit point near the pillow block 18. The rails 35 are mounted in the support members 7 at an appropriate distance from the chains 29 so as to engage the moving food molds 33 and to run substantially parallel with the adjacent portions of the chains 29. Near the pillow block 8, at the point where the moving molds 33 enter the guide rails 35, outwardly extending flanges 36 are mounted on each set of the rails 35. The flanges 36 operate to receive the normally open molds 33, fold the moving molds 33 into their closed position, and guide the molds 33 into the guide rails 35. The rails 35 engage the moving molds 33 throughout their passage in the vat 3 and until each mold 33 reaches an exit point from the rails 35 just below the pillow block 18. Wet fat drains from the tortilla in the mold 33 during the travel of the mold 33 between the pillow blocks 9 and 18. At the exit point, each mold 33 is moved out of engagement with the rails 35 and, as will be explained, then springs into its normally open position. A tortilla loaded in the mold 33 is then discharged by the action of the mold 33 onto a downward extending tray 37, which tray 37 is positioned as shown in FIG. 1 just to the left of the point of exit from the guide rails 35.

Figure 3:
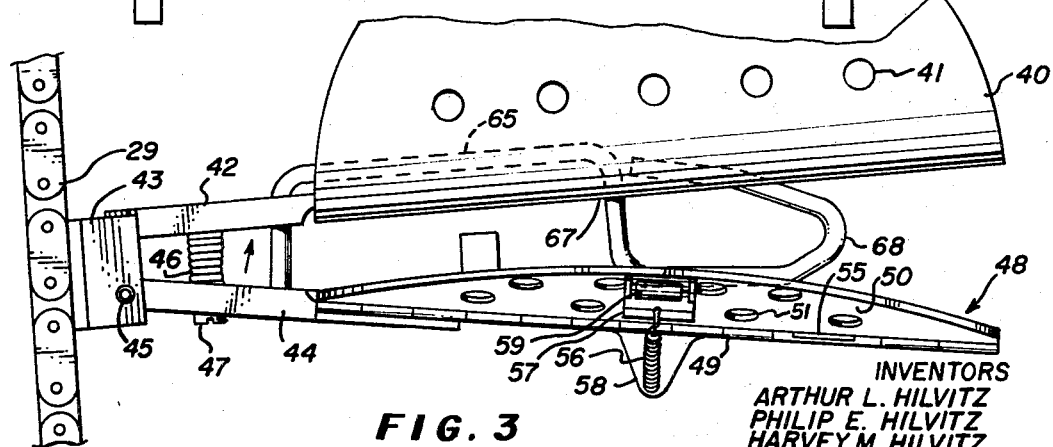
FIG. 3 is a side view of a food holding unit in its normally open position.
Figure 4:
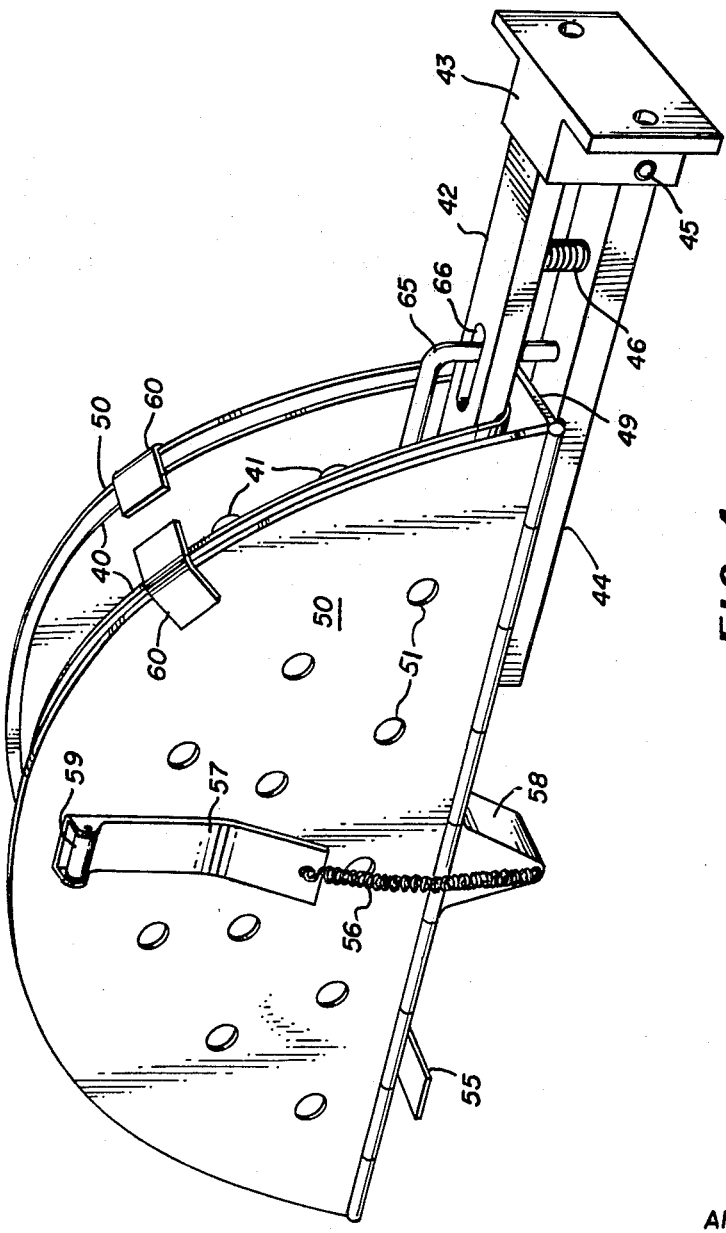
FIG. 4 is a pictorial view of a food holding unit in its closed position.

The detailed construction of the individual food holding units, or food molds 33, may be more clearly seen in FIGS. 3 and 4. FIG. 3 shows the food mold 33 in its normally open position attached to the chain 29. The mold 33 includes an inner V-shaped member 40 having holes 41 therein. The V-shaped member was formed in the exemplary food cooking apparatus by diametrically bending a circular metal disc having holes therein into a V-shaped form. The V-shaped member 40 is rigidly mounted on a rigid arm 42 and the arm 42 is fixedly mounted to a block 43. The block 43 is attached to the chain 29, for example, by bolting thereto.

Pivotally mounted on the block 43 below the arm 42, as shown in FIG. 3, is a rigid arm 44. The arm 44 pivots about the pivot point 45 in the block 43. A compression spring 46 is mounted on an adjustable screw means 47 between the arms 42 and 44 for biasing the arms 42 and 44 in a normally spaced apart position. The screw means 47 is taped into the arm 44 and engages the arm 42. By adjusting the screw means 47, the tension provided by the spring 46 upon the arms 42 and 44 may be controlled.

Mounted on the arm 44 is a foldable food supporting member 48. The food supporting member 48 when in its normally open unfolded position forms a circular plate-like member, and in its closed folded position folds around the V-shaped member 40 to form a V-shaped tortilla mold. The food supporting member 48 was formed in the exemplary food cooking apparatus by mounting a narrow flat arm 49 on the arm 44. The arm 49 provides an extension of the arm 44 and extends, as shown in FIG. 3, beneath the lower edge of the V-shaped member 40. Semi-circular plates 50 with holes 51 therein are hinged along both sides of the arm 49. The plates 50 are appropriately dimensioned to enclose the V-shaped member 40 whenever the food mold 33 is in its closed position.

As shown in FIGS. 3 and 4, thin, rigid, flat projections 55 are mounted on each side of the lower portion of the arm 49. The projections 55 extend in substantially the same plane and provide stops for supporting the plates 50. With the food supporting member 48 in its normally open position, the projections 55 support plates 50 in a coplanar position with the upper surface of the arm 49. Thereby, a circular plate-like member is formed onto which uncooked tortilla cakes may be loaded.

In FIG. 4, a spring 56 is shown for biasing the plates 50 against the projections, or stops 55, thereby to bias the food supporting member 48 in its normally open position. The spring 56 is connected between a leaf-like attachment 57 mounted on the outer side of each of the plates 50 and a projection 58 mounted on the lower surface of the arm 49. Rollers 59 are mounted on the leaf-like attachments 57 so that the molds 33 move in rolling engagement with the guide rails 35. Mounted on the outer edges of the semicircular plates 50 are projections 60. The projections 60 are so formed so as to extend at least in part perpendicularly to the surface of the plates 50 and when the molds 33 are in their closed position to extend inwardly toward each other. The projections 60 are formed so as to be substantially flat and provide means for engaging the V-shaped member 40 when the mold 33 is closed, thereby holding the mold 33 in a closed position as it is moved through the guide rails 35. The projections 60 also serve to support a tortilla loaded in the molds 33.

As shown in FIGS. 3 and 4, an arm 65 is mounted on the arm 44. The arm 65 extends up from the arm 44 through a slot 66 formed in the arm 42. After passing through the slot 66, the arm 65 is bent substantially at a right angle and extends along the center line of the V-shaped member 40 to near its center. At approximately the center of the V-shaped member 40, a slot 67 is formed longitudinally therein. Adjacent the slot 67, the arm 65 is bent downwardly to form a pusher means 68. The pusher means 68 is so formed to have a longitudinally running, rounded surface on its lower portion suitable for pushing or discharging cooked tortillas from the individual food molds 33. With the food mold 33 in its normally open position, the pusher means 68 extends through the V-shaped member 40 a substantial distance. With the food mold 33 in its closed position, the arm 44 is pivoted toward the V-shaped member 40, and as a result, the pusher means 68 is moved to a position substantially within the V-shaped member 40.

In operation, the motor 31 continuously drives the chains 29 at a desired speed in a clockwise direction, as indicated by the arrows in FIG. 1. As a result, the food molds 33 are continuously moved in a clockwise direction and once in each cycle of the chain 29 are moved through the vat 3. The heat source 5 is illuminated and heats the fat 4 in the vat 3 to a suitable temperature, such as 375°–400° F.

To explain the manner in which a tortilla is cooked, the cycle of one food mold 33 is traced from its position at the pillow block 16 until its return thereto. As the food mold 33 descends from the pillow block 16 towards the pillow block 18, the food mold 33 is in its normally unfolded open position. The food mold 33 is in the unfolded position since the compression spring 46 biases the arms 42 and 44 of the mold 33 away from each other, and the springs 56 bias the plates 50 against the stops 55. As the food mold 33 is moved downward towards the pillow block 8, an uncooked tortilla cake 70 is placed on the food supporting member 48. In FIG. 2, the manner in which the tortilla cake 70 is slid into the food mold 33 is indicated by an arrow. Shortly after the placement of the uncooked tortilla 70 in the mold 33, the mold 33 is moved downward into engagement with the flanges 36. The flanges 36 engage the semicircular plates 50 and fold the plates 50 around the V-shaped member 40. The flanges 36 guide the now folded mold 33 into engagement with the guide rails 35. The combined friction of the flanges 36 and the guide rails 35 on the leaf-like attachments 57 and the rollers 59 of the plates 50 provides a sufficient force to compress the compression spring 46, thereby forcing the mold 33 into its closed position. The mold 33 in its closed position has the springs 56 extended and the flat projections 60 in folded over engagement with the V-shaped member 40. As a result, the uncooked tortilla is now folded into its V-shape and the guide rails 35 in conjunction with the engagement of the projection 60 on the V-shaped member 40 prevents the mold 33 from opening. Thereby, the tortilla 70 is held in the food mold 33. As the mold 33 moves in the guide rails 35, it is noted that the rollers 59 on the outside surfaces of the hinged plates 50 permit the mold 33 to move through the guide rails 35 with very little friction.

The mold 33 is then rotated around the pillow block 8 and down into the body of frying fat 4 in the vat 3. The loaded food mold 33 moves through the frying fat 4 and past the pillow block 9. Shortly after turning on the pillow block 9, the food mold 33 is moved out of the frying fat 4 and upward toward the pillow block 18. It is noted that the vat 3 extends slightly beyond the pillow block 9 so that as the loaded mold 33 is moved out of the vat 3, frying fat 4 dripping therefrom will fall back into the vat 3 and thereby be recovered. The mold 33 is then removed upward to the point of exit from the guide rails 35.

Once the food mold 33 moves out of engagement with the guide rails 35, the pressure is taken off the leaf-like attachments 57 and the rollers 59 of the hinged plates 50 and the spring 56 causes the plates 50 to be pulled outward so that the food mold 33 resumes its normally open unfolded position. With the food mold in its normally open position, the spring 56 forces the arms 42 and 44 apart. As a result, the arm 65, which is mounted on the arm 44, is forced toward the V-shaped member 40, and the pusher means 68 is extended through the slot 67. Due to the fact that the mold 33 is now inverted, the cooked tortilla 70 rests on the V-shaped member 40. The action of the pusher means 68 moving abruptly through the slot 67 then pushes upward on the tortilla 70 to discharge the cooked tortilla 70 from the food mold 33. Due to gravity, the discharged tortilla 70 falls onto the tray 37. The tray 37 acts as a food collecting means and the cooked tortillas 70 slide sown the tray 37 to a position at which they are gathered and removed from the food cooking apparatus. The now empty open mold 33 is moved past the pillow block 18 back to the pillow block 16, thereby to complete one cycle of travel.

It is noted that in a food cooking apparatus constructed in accordance with the present invention, four chains containing 33 molds per chain were used for mass producing tortillas. The molds were spaced 6 inches apart on each chain. The frying fat in the constructed apparatus was heated to a temperature of 375°–400° F. The chains were driven at an appropriate velocity at which each tortilla was cooked for a period of approximately 27 seconds. The length of the vat in the constructed apparatus was approximately 6 ft. long. With this apparatus constructed in accordance with the present invention, approximately 300 dozen cooked tortillas were prepared each hour.

It is further noted that while endless chains with pillow block are described as providing the endless conveyor means for moving the food molds, other forms of conveyor means, such as continuously driven belts with the molds attached thereto, could also be employed. Further, it is in the spirit of the present invention that means other than a tray could be used for collecting the cooked tortillas, that more or less endless chains could be employed to move more or less molds, and that the vat for holding the frying fat could be formed in any suitable shape.

Thus, there has been provided an improved food cooking apparatus for cooking V-shaped food products which is substantially automatic in operation and capable of producing V-shaped food products, such as tortillas, at a relatively high rate. The improved food cooking apparatus provided also automatically discharges and collects the cooked tortillas. In the cooking apparatus, improved foldable food holding units have also been provided having a normally open unfolded position for receiving an uncooked food product and a selectively closed folded position for molding the food product into a V-shape.

We claim:

1. In combination with a food cooking apparatus wherein cooked V-shaped food products are manufactured by loading uncooked food products into a plurality of food holding units and moving said food holding units through a cooking vessel, the improvement comprising:

said food holding units being foldable, each of said food holding units having a normally open unfolded position for receiving an uncooked food product and a selectively closed folded position for molding said food product into a V-shape;

guide means for engaging said food holding units to fold said units into their closed positions and for guiding said units through said cooking vessel, each of said units being operable to spring into its normally open unfolded position upon moving out of engagement with said guide means; and each of said units including discharge means operable by the spring action of said unit to discharge a V-shaped food product whenever said unit springs into its normally open position.

2. The invention recited in claim 1, wherein said guide means includes at least one parallel set of guide rails having outwardly extending flanges mounted at the entrance of said guide rails, said flanges being operable to engage said food holding units whereby to fold said food holding units into their closed position and guide said food holding units into said guide rails.

3. The invention recited in claim 2, wherein:

a first portion of said guide rails defines a path for said food holding units into and within said bath and a second portion of said guide rails defines an exit path from said bath; and said bath defined in said cooking vessel extends below said second portion of said guide rails whereby frying fat draining from one of said food holding units being moved out of said bath drains into said bath so as to be recovered.

4. The invention recited in claim 1, including heater means for maintaining the frying fat in said cooking vessel at a predetermined temperature.

5. Apparatus for manufacturing cooked V-shaped food products, comprising:

a cooking vessel defining a bath for holding heated frying fat;

a plurality of foldable food holding units, each having a normally open unfolded position for receiving an uncooked food product and a selectively closed folded position for molding said food product into a V-shape, each of said food holding units comprising a V-shaped member and a normally flat food holding member, said food holding member having a pair of plates hingedly mounted to be selectively foldable about said V-shaped member whereby to selectively form a V-shaped food mold, and each of said food holding units including means for biasing said hinged plates in a normally coplanar relation;

guide means for engaging said hinged plates of said food holding units to fold said hinged plates about said V-shaped members whereby to place said food holding units in their closed position, said guide means mounted to define a path for said food holding units through said bath in said cooking vessel;

endless conveyor means having said food holding units mounted in spaced relation thereon, said conveyor means being mounted with respect to said guide means for moving each of said food holding units during portions of each cycle of said conveyor means into engagement with said guide means whereby food products loaded in said food holding units are guided through said bath and cooked in V-shaped form, and said food holding units including means for discharging a V-shaped product by spring action of the food holding unit whenever said unit springs into its normally open position.

6. The invention recited in claim 5, wherein said guide means includes at least one parallel set of guide rails having outwardly extending flanges mounted at the entrance of said guide rails, said flanges being operable to engage said hinged plates of said food holding units whereby to fold said food holding units into their closed position and guide said food holding units into said guide rails.

7. The invention recited in claim 5, wherein:

a first portion of said guide means defines a path for said food holding units into and within said bath and a second portion of said guide means defines an exit path from said bath; and said bath defined in said cooking vessel extends below said second portion of said guide means whereby frying fat draining from one of said food holding units being moved out of said bath drains into said bath so as to be recovered.

8. The invention recited in claim 6, wherein:

a first portion of said guide rails defines a path for said food holding units into and within said bath and a second portion of said guide rails defines an exit path from said bath; and said bath defined in said cooking vessel extends below said second portion of said guide rails whereby frying fat draining from one of said food holding units being moved out of said bath drains into said bath so as to be recovered.

9. The invention recited in claim 5, wherein:

said endless conveyor means includes at least one endless chain mounted on sprocket drive means and power drive means for driving said sprocket drive means whereby to drive said chain; and said food holding units are mounted in spaced apart relation on said chain.

10. The invention recited in claim 5, including heater means for maintaining the frying fat in said cooking vessel at a predetermined temperature.

11. Apparatus for manufacturing cooked V-shaped food products, comprising:

a cooking vessel defining a bath for holding a heated frying fat;

a plurality of foldable food holding units each having a normally open unfolded position for receiving an uncooked food product and a selectively closed folded position for molding said food product into a V-shape, each of said food holding units comprising:

a V-shaped member, said V-shaped member having a slot therein;

a normally flat food holding member, said food holding member being pivotally mounted with respect to said V-shaped member to swing toward or away therefrom, said food holding member having a pair of plates hingedly mounted to be selectively foldable about said V-shaped member;

means for biasing said hinged plates in a normally coplanar relation;

means for biasing said food holding member in a normally predetermined spaced relationship away from said V-shaped member;

an arm mounted on said food holding member to pivot therewith and extend within said V-shaped member to a position adjacent said slot; and pusher means mounted on said arm adjacent said slot for extending through said slot whenever said food holding member is biased in said predetermined spaced relationship away from said V-shaped member and for retracting from said slot into the space within said V-shaped member whenever said food holding member is pivoted toward said V-shaped member;

guide means for engaging said hinged plates of said food holding units, said guide means being operable upon engaging said hinged plates of any one of said food holding units to simultaneously fold said hinged plates about said V-shaped member and pivot said food holding member toward said V-shaped member whereby to form a V-shaped food mold and retract said pusher means into the space within said V-shaped member, said guide means mounted to define a path for said food holding units through said bath in said cooking vessel; and endless conveyor means having said food holding units mounted in spaced relation thereon, said conveyor means being mounted with respect to said guide means for moving each of said food holding units during portions of each cycle of said conveyor means into engagement with said guide means whereby food products loaded in said food holding units are guided through said bath and cooked in V-shaped form, said guide means and said conveyor means being positioned with respect to each other so that as any one of said food holding units exits said guide means said V-shaped member thereof supports the cooked food product therein whereby as said one food holding unit assumes its normal open position said pusher means thereof is moved through said slot to discharge the cooked food product therefrom.

12. The invention recited in claim 11, including means for collecting cooked V-shaped food products which have been discharged from said food holding units.

13. The invention recited in claim 11, including heater means for maintaining the frying fat in said cooking vessel at a predetermined temperature.

14. The invention recited in claim 11, including means mounted on said hinged plates of each one of said food holding units for engaging said V-shaped members thereof whenever said food holding units are folded in their closed position in said guide means whereby in said guide means said food holding member of any one of said food holding units is held in a fixed closed position with respect to said V-shaped member thereof so that said pusher means thereof is retracted from said slot.

15. The invention recited in claim 11, wherein:

said means for biasing said hinged plates includes stop means for supporting said hinged plates in a coplanar relation and spring means for biasing said hinged plates normally against said stop means; and said means for normally biasing said food holding member in a predetermined spaced relationship away from said V-shaped member includes a compression spring; and including roller means mounted on each pair of hinged plates for engaging said guide means.

16. The invention recited in claim 11, wherein said guide means includes at least one parallel set of guide rails having outwardly extending flanges mounted at the entrance of said guide rails, said flanges being operable to engage said hinged plates of said food holding units whereby to fold said food holding units into their closed position and guide said food holding units into said guide rails.

17. The invention recited in claim 11, wherein a first portion of said guide means defines a path for said food holding units into and within said bath and a second portion of said guide means defines an exit path from said bath; and said bath defined in said cooking vessel extends below said second portion of said guide means whereby frying fat draining from one of said food holding units being moved out of said bath drains into said bath so as to be recovered.

18. The invention recited in claim 16, wherein:

a first portion of said guide rails defines a path for said food holding units into and within said bath and a second portion of said guide rails defines an exit path from said bath; and said bath defined in said cooking vessel extends below said second portion of said guide rails whereby frying fat draining from one of said food holding units being moved out of said bath drains into said bath so as to be recovered.

19. The invention recited in claim 1, wherein means are included for collecting cooked V-shaped food products which have been discharged from said food holding units.

* * * * *